US009925640B2

(12) United States Patent
Willis et al.

(10) Patent No.: US 9,925,640 B2
(45) Date of Patent: Mar. 27, 2018

(54) MEMORIAL CREATION PROCESS INCLUDING ORDERING SOFTWARE AND ENGRAVING

(71) Applicant: Rayzist Photomask, Inc., Vista, CA (US)

(72) Inventors: Randy Willis, Vista, CA (US); Roderick Geis, Vista, CA (US); Josh Willis, Vista, CA (US)

(*) Notice: Subject to any disclaimer, the term of this patent is extended or adjusted under 35 U.S.C. 154(b) by 131 days.

(21) Appl. No.: 14/326,035

(22) Filed: Jul. 8, 2014

(65) Prior Publication Data
US 2016/0008951 A1 Jan. 14, 2016

(51) Int. Cl.
*B24C 1/04* (2006.01)
*G06Q 30/06* (2012.01)

(52) U.S. Cl.
CPC ........... *B24C 1/04* (2013.01); *G06Q 30/0621* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 5,370,762 A | * | 12/1994 | Zukowski | G03F 7/12 156/154 |
| 5,381,591 A | * | 1/1995 | Ponger | E04H 13/006 27/3 |
| RE38,114 E | * | 5/2003 | Souders | G03F 7/12 430/271.1 |
| 2008/0154413 A1 | * | 6/2008 | Proudfoot | G06Q 30/06 700/98 |
| 2009/0030804 A1 | * | 1/2009 | Sell | A61G 17/00 705/26.5 |
| 2010/0166619 A1 | * | 7/2010 | Dietz | C09J 7/045 422/179 |

OTHER PUBLICATIONS

Unboxing and Review of Vistaprint.com Products; available at https://www.youtube.com/watch?v=ke301y6S61c, published Aug. 24, 2012; retrieved Aug. 18, 2016.*

* cited by examiner

Primary Examiner — Michael P Rodriguez

(57) ABSTRACT

The present invention provides, in at least one embodiment, a memorial process in the memorial industry utilizing a novel photo resist process and novel state of the art design ordering software. The software allows the customer to create and order a design online with the family present. The software solves problems including that the conventional process requires an approval of a layout or requires a professional draftsman on site to draw the customer's design. The software also allows for barcode label tracking throughout the process. Finely detailed engravings are achieved using the photo resist engraving process in the memorial industry, where the photo resist is repositionable prior to being applied to the memorial.

10 Claims, 4 Drawing Sheets

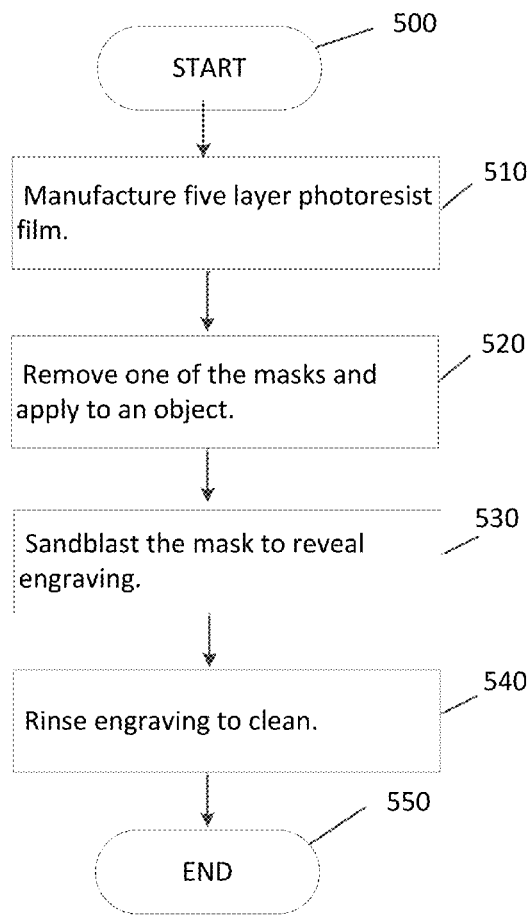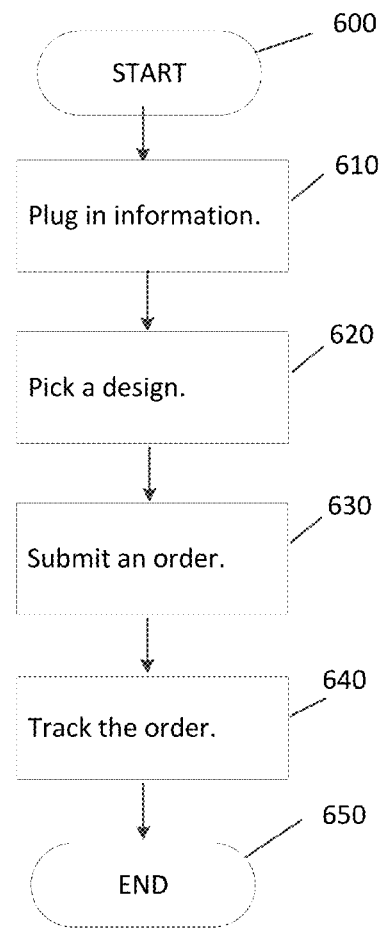
Fig. 5
Fig. 6

MEMORIAL CREATION PROCESS INCLUDING ORDERING SOFTWARE AND ENGRAVING

CROSS REFERENCE TO RELATED APPLICATIONS

This continuation-in-part application claims the benefit of U.S. patent application Ser. No. 13/975,581, filed Aug. 26, 2013 and entitled "Photo resist film with adhesive layer and microspheres" and U.S. patent application Ser. No. 14/216,133, filed Mar. 17, 2014, and entitled "Engraved product design software," the disclosures of which are hereby incorporated by reference in its entirety.

BACKGROUND OF THE INVENTION

1. Field of Invention

The invention relates generally to the memorial industry such as headstones, sculptures, statues, and more particularly, to a novel computer software program and a novel engraving process in the memorial industry.

2. Description of Related Art

Engraving is the practice of incising a design onto a typically hard surface by cutting grooves into the surface. Common surfaces to engrave include glass, wood, stone or any other hard surface that will abrade away.

One type of engraved product is a memorial that is engraved into a stone. In this product, the engraving creates a design on the stone. Memorials serve as an object for the memory of a person or an event, often honoring and preserving the memory of someone who has died. A common type of memorial is a headstone to mark a grave site. The headstone, also referred to as a gravestone or a tombstone, is placed over a grave for a traditional burial. Another type of memorial is a memorial plaque, which commemorates the memory of an event or one or more people. Other memorials include sculptures, statues, fountains and landmark objects such as a park bench.

Conventionally in the memorial industry, the memorial creation process requires a skilled computer graphics person to create a layout which is a design of the memorial which needs to be approved the customer, typically the family of a deceased. After approval, the layout is sent to a "plotter" which is a device that cuts out a stencil of 1/16 inch rubber or "vinyl" material.

Once the design is complete, a person performs the labor intensive process referred to as "weeding." In weeding, a person removes all cut letters to create open spaces which the layout will be sandblasted through. This conventional process requires a significant amount of work and is limited on how detailed a design can be, compared to a photo resist process. Next, the design is sandblasted, and then after that, paint is applied. Lastly, the design is cleaned and ready to be delivered. Since there is no tracking system, the customer typically becomes aware of the status of their order upon delivery.

However, this process of obtaining the customer's approval for the design layout highlights a problem in the engraving industry, which is the inability to show the customer exactly what their design will look like while the customer is still at the retail location and ready and willing to make a purchase. Although sometimes the customer approves the design layout without changes and the purchase can be made at that point, other times the customer prefers to make changes such as font size of the deceased's last name. One reason for this problem is that the current engraving process requires the collected information to be sent to a vender to design and produce the layout, a step which is undesirable. This is undesirable because the customer must wait (e.g., usually 2-3 days) for the vendor to provide the design layout of what the memorial will look like. By then, a large percentage of customers have changed their mind and decided not to purchase the memorial. This leads to wasted time and effort, and just as important, the number of sales drop by approximately 40% after the customer walks out the door, for a customer who had already submitted a design and was ready to make a purchase.

One way to minimize this problem is to have one or more graphic artists (e.g., professional draftsman) on site to draw the design layout while the customer is still at the retail location. However, most retail locations do not have the resources to have both a salesperson and a professional draftsman on site to help the customer, and therefore this option is not desirable, although currently performed by some businesses.

An additional problem in the engraving industry is the lack of software that allows the salesperson or the customer to track the production of their order as it proceeds through various stages. Without this software, the customer is unable to easily track the status of their order. Furthermore, when the customer does seek the status of their order, this takes time away from the salesperson and/or the vendor.

U.S. Pat. No. 7,894,924 to Proudfoot discloses a system and method for manufacturing a memorial. The method provides a blank pattern in a memorial design and collaboration system having a specified shape and size, and building a memorial preview thereon, then sending the memorial preview to a host computer. The host computer routes the memorial preview as a stored file to a manufacturer for projecting, onto a three-dimensional solid in the shape of said blank pattern. However, Proudfoot does not allow the ability for a person who is not a professional draftsman to create the design layout, does not allow the ability to track or monitor the production process after ordering, and does not allow a customized design template to be imported by a customer.

Even after the layout has been ordered, other companies in the memorial industry do not use the photo resist process. However, even within the photo resist process, the user cannot reposition the photo resist film on a surface of an object such that the design can be observed on the memorial, and such that the precise arrangement can be confirmed prior to adhesion. Once a conventional film is applied to the surface, it cannot be moved to a different part of the surface.

U.S. Pat. No. 4,764,449 to Vanlseghem provides a method of forming an engraved pattern in the surface of a complex contour on an object such as a wine globet. Vanlseghem has a photo resist laminate comprising a resist layer, a support membrane, and an adhesive layer, which are exposed with an ultraviolet light to leave a desired pattern. However, Vanlseghem's adhesive is like that of many conventional engravings, where the film's adhesive has a high degree of tack and cohesive strength. Vanlseghem's adhesive tends to bond almost instantaneously to a surface with slight contact pressure at the interface between the adhesive and the contacted surface. Since Vanlseghem's adhesive has a high degree of tack, it cannot be easily shifted, rotated, moved, or otherwise repositioned prior to applying pressure. Further, Vanlseghem does not apply the photo resist process to the memorial industry.

SUMMARY OF THE INVENTION

The present invention provides, in at least one embodiment, a memorial process in the memorial industry utilizing a novel photo resist process and novel state of the art design ordering software. The software allows the customer to create and order a design online with the family present. The software solves problems including that the conventional process requires an approval of a layout or requires a professional draftsman on site to draw the customer's design. The software also allows for barcode label tracking throughout the process. Finely detailed engravings are achieved using the photo resist engraving process in the memorial industry, where the photo resist is repositionable prior to being applied to the memorial.

In one embodiment, a method comprises: receiving a layout designed by a user of the computer software program; transmitting the layout to a manufacturer using the computer software program; applying an image of the layout onto a photo resist film; exposing the photo resist film having the image of the layout applied thereon with ultraviolet light to burn the image of the layout into the photo resist film; applying the photo resist film to a memorial; applying a barcode label to the memorial, wherein the barcode label is configured to assist in the tracking of an order; and engraving through the photo resist film into the memorial to engrave the image of the layout into the memorial. The photo resist film may be repositionable on the memorial prior to said applying. The image of the layout may comprise a film positive, the user may comprise a customer or a salesperson, the user is not required to be a professional draftsman, and the engraving may comprise sandblasting. The method may further comprise painting an engraved surface of the memorial after engraving and may further comprise shipping the memorial after engraving to a cemetery, a home of the user, or a business of the user. The method may further comprise notifying the user that the process is complete.

In another embodiment, a system comprises: a computer software program configured to receive a layout designed by a user; a manufacturer configured to receive the layout; a photo resist film having an image of the layout applied thereon, wherein the photo resist film is configured to be exposed to ultraviolet light to burn the image of the layout into the photo resist film; and a barcode label, wherein the barcode label and the photo resist film are applied to a memorial, wherein the barcode label is configured assist in the tracking of an order, wherein the image of the layout is engraved through the photo resist film into the memorial. The photo resist film may be repositionable on the memorial prior to being applied.

In a further embodiment, a method comprises: receiving a layout designed by a user of a computer software program; transmitting the layout to a manufacturer using the computer software program; applying an image of the layout onto a photo resist film; exposing the photo resist film having the image of the layout applied thereon with ultraviolet light to burn the image of the layout into the photo resist film; applying the photo resist film to a memorial; and engraving through the photo resist film into the memorial to engrave the image of the layout into the memorial.

An advantage of the present invention is the computer software program allows the customer to see what the finished engraved product is going to look like during the first session (e.g., in 15 minutes) and prior to the purchase without the need for ordering a design layout or having a professional draftsman on site. This addresses the high need for customer satisfaction, strong deadlines, and the inherent emotion when ordering a memorial. Also, in the memorial industry, this allows the customer to purchase a memorial while purchasing other cemetery related needs, such as flowers, a plot, and a casket on the same day.

Another advantage is that the computer software program allows the customer to track the status of their order as it progresses through the manufacturing and delivery process. Also, the customer can find status updates quickly, and the vendor spends less time providing these updates.

A further of the present invention is using the photo resist process in the memorial industry. Additionally, using a photo resist film that is very easy to remove and reattach to in a different location on an object such as the memorial prior to pressure being applied, yet after pressure is applied, the attachment is strong enough to not move during the engraving process. This repositionable feature is accomplished through a unique adhesive layer. The repositionable photo resist film sticks very well, and thus is configured to attach to a broad range of surfaces given the repositionable nature of the film, which one might expect only attached to polished surfaces such as glass, and not other surfaces such as rocks, flagstone, etc.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows:

FIG. 5 illustrates the process of engraving an object using the photo resist film according to an embodiment of the invention;

FIG. 6 illustrates the process of designing and ordering an engraved product from the customer's perspective according to an embodiment of the invention.

DETAILED DESCRIPTION OF EMBODIMENTS

Figure 1:
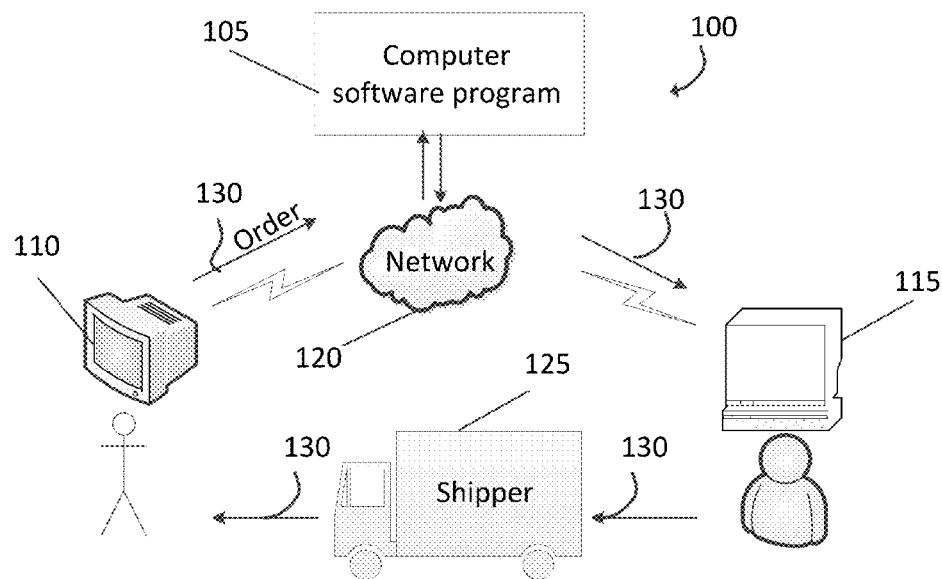
FIG. 1 illustrates a detailed view of the system according to an embodiment of the invention.

Further features and advantages of the invention, as well as the structure and operation of various embodiments of the invention, are described in detail below with reference to the accompanying FIGS. 1-7, wherein like reference numerals refer to like elements.

Although the invention is at times described using vinyl or rubber stencil to remove photo resist material after being exposed with ultraviolet light, one with ordinary skill in the art readily appreciates that the present invention can be implemented using any stencil with this process, including but not limited to rubber, vinyl, machine cut, hand cut, etc., without departing from the spirit of the invention. Additionally, although the invention is at times described as sandblasting, other forms of engraving, such as etching are also possible. For the purposes of the present application, the term and process of "engraving" is used to represent similar processes, and as such is defined to include at least the processes of engraving, sandblasting, etching, frosting, and sandcarving.

Embodiments of the present invention provide the actual process from the ordering, manufacturing, and delivery of a memorial, where the memorial is the finished product including a stone and includes a design of engraved letters, numbers, designs, and/or other text. Both the software and the photo resist are improvements to the memorial industry, with the software eliminating the conventional layout approval process and allowing for tracking and the photo resist process being used in the memorial industry as opposed to plotter, vinyl, and weeding and also allowing for repositioning the photo resist prior to engraving.

FIG. 1 illustrates a detailed view of the system 100 according to an embodiment of the invention. The system 100 includes a computer software program 105, a customer's terminal device 110, a vendor's terminal device 115, a network 120, a shipper 125, and an order 130. FIG. 1 illustrates the order 130 flowing from the customer's terminal device 110 to the vender's terminal device 115 through the network 120 leveraging the computer software program 105, before being shipped back by the shipper 125 to complete the order 130.

The customer's terminal device 110 is typically a computer, although it can be any other device known by one with skill in the art for transmitting the customer's order. Similarly, the vendor's terminal device 115 can be any device known by one with skill in the art for receiving the customer's order, such as a computer. The computer software program 105 allows for real time approval from the customer 205 for a process which conventionally takes several days, which is of significant value in the memorial industry, with the concerns of emotional customers, tight deadlines and absolute accuracy. The computer software program 105 allows the user to communicate with the manufacturer through a communication portal, such as a correction of dates on the memorial.

The network 120 connects both the customer's terminal device 110 and the vendor's terminal device 115 to the computer software program 105. In one embodiment, the network is the Internet. The connection between the computer software program 105 and the devices 110 and 115 can be a network access server.

The shipper 125 ships the order 130 to complete the transaction. Although illustrated as a delivery truck, one skilled in the art is aware of other methods for shipping engraved products, such as by boat or plane.

The order 130 includes a customized design for an engraved product. Additionally, the order can include any supplemental information to complete the order 130, such as a shipping address, estimated shipping date, contact information, special instructions, price, etc.

Figure 2:
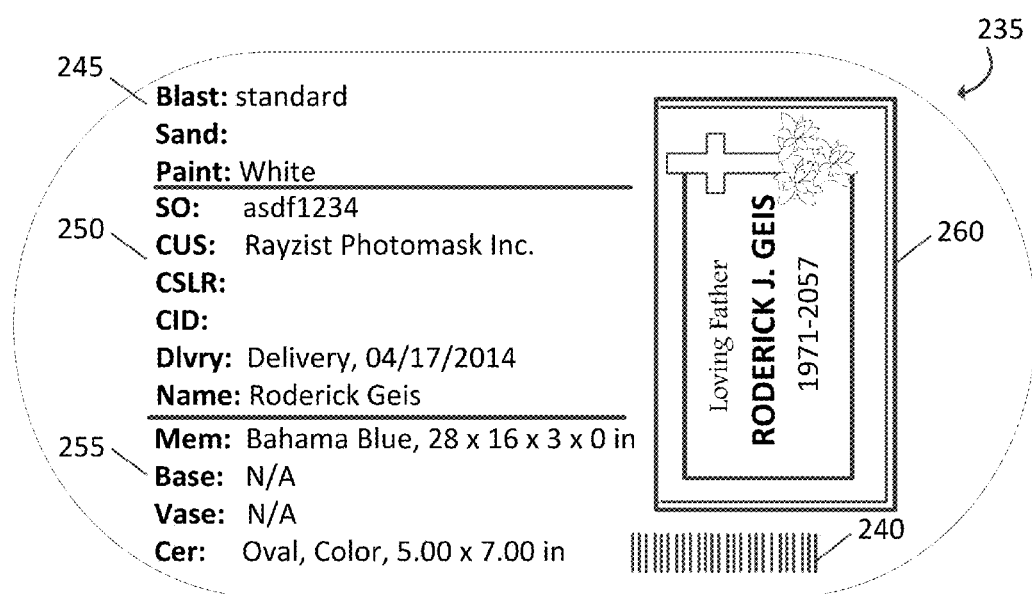
FIG. 2 illustrates a barcode label created by the system according to an embodiment of the invention.

FIG. 2 illustrates the barcode label 235 created by the system 100 according to an embodiment of the invention. The barcode label 235 includes a barcode 240, engraving information 245, order delivery information 250, memorial information 255, and a thumbnail 260 of the layout.

The barcode label 235 (also referred to as a label, tracking label, or barcode identification) contains the barcode 240, which is generated and assigned by the computer software program 105 for identification and tracking purposes. The barcode label 235 assists in providing information to the customer regarding the status of their order. For example, after a manufacturer reviews the artwork for quality control, by a review desk quality control check, the manufacturer prints the barcode label 235 and clips it to a "film positive" of a photo resist film used to engrave the product. In a film positive, the area of the film that is exposed to the ultraviolet light is washed away. The film positive is washed away such that this open area can be later engraved. In other words, in the film positive, what you see is what you get as your end result in the memorial. The barcode label 235 is then applied to the product to be engraved (e.g., a memorial) prior to blasting the engraved artwork onto the product. The barcode label 235 is used to report on the status of the product throughout the manufacturing process.

The engraving information 245 on the barcode label 235 may include the depth of sandblasting such as skin sunk, standard, or deep sunk. The engraving information 245 may also include any extra areas to be sanded or frosted, such as a border, a panel, or the artwork. Further, the engraving information 245 may include the color of paint for paint fill, such as black, white, gold, etc.

The order delivery information 250 may include a sales order number, a name of the wholesale customer, a customer's location for receipt of goods, a customer identification, a delivery date, and the name of the deceased.

The memorial information 255 includes the stone color and dimensions of the memorial, the stone color and dimensions of the base, the stone color and dimensions of the vase, and the type and size of a ceramic photograph.

The thumbnail 260 of the layout is a reduced size but accurate representation of the layout such that it can easily fit on a barcode label. The thumbnail 260 allows the manufacturer to verify the correct layout is engraved into the memorial, where the layout is designed and created by the user, such as the customer and/or salesperson. The layout may also be referred to as a design, a sample, a template, computer graphics, a design layout, etc.

Figure 3:
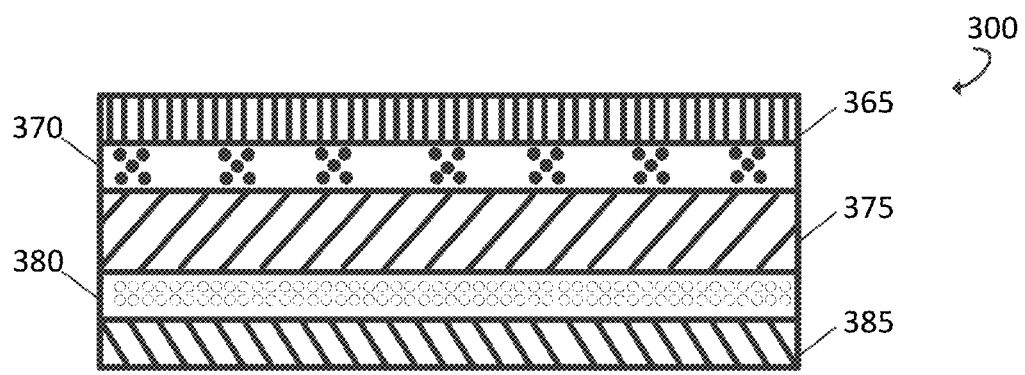
FIG. 3 illustrates a side view of a five layer photo resist film according to an embodiment of the invention.

FIG. 3 illustrates a side view of a five layer photo resist film 300 according to an embodiment of the invention. The film 300 comprises a silicon layer 365, an adhesive layer 370, a membrane layer 375, a photo resist layer 380, and a top coat layer 385. The film 300 is configured to have areas where at least the photo resist layer 380 is removed (i.e., a design cutout portion), in the shape of the desired design, such that the engraving process can engrave an object which the film 300 is attached to.

The silicon layer 365, which may also referred to as layer 1, is coated onto polyester/polypropylene or an equivalent release liner. The silicon layer 365 is configured to be peeled away from the remaining layers prior to placing the remaining layers on an object. The silicon layer 365 may also be referred to as the substrate or as a release liner. The details of the silicon layer are known by those with skill in the art. In one embodiment, the silicon layer 365 comprises a polyester film having a thickness of between 2 mil to 10 mils. In another embodiment, polypropylene or other substrates that are capable of being coated on, may be substituted for the polyester film.

The adhesive layer 370, which may also referred to as layer 2, is a novel way to provide attachment to an object such as the memorial, and provides a much easier engraving process by allowing the user to easily move, remove, and reattach the film 300 before applying pressure and before engraving. The adhesive layer includes a pressure sensitive adhesive, such as polyvinyl acetate (sometimes referred to as PVA or wood glue) with applied thickness ranges from 4 microns to 10 microns. The adhesive layer is what sticks the stencil/mask to the object to be engraved.

The membrane layer 375, which may also referred to as layer 3, is a water resistant membrane. The purpose of membrane 375 is to protect the adhesive layer 370 and hold the mask together during the application process. The membrane layer is made of polyurethane, an acrylic, or another water dispersible product that after it dries creates a water barrier insoluble to water. The thickness of membrane ranges 0.05 mils to 1 mil.

The photo resist layer 380, which may also referred to as layer 4 or the film layer, blocks the engraving blast. The photo resist layer 380 comprises a photo resist material (UV sensitive) which is soluble or dispersible in water but which will harden upon exposure to a UV source. The photo resist layer 380 will cure exposed areas making them insoluble to water. The photo resist layer 380 could be a normal silkscreen emulsion or any other light sensitive emulsion. The photo resist layer 380, along with the microspheres comprising small balls of air which strengthen the photo resist layer and make the film 300 stronger. Although microspheres are at times illustrated and described, embodiments of the present invention include the photo resist process without microspheres.

The top coat layer 385, which may also referred to as layer 5, is described in U.S. Pat. No. RE 38,114 issued to Rayzist Photomask, incorporated herein by reference. In this reissue patent, the top coat layer is described as being designed to keep artwork from sticking to surface during an ultraviolet (UV) curing operation.

Figure 4:
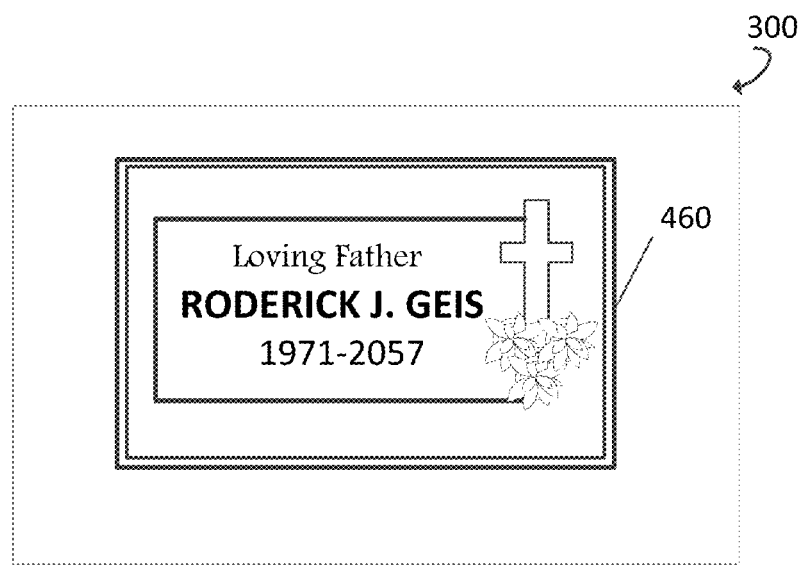
FIG. 4 illustrates a top view of the film according to an embodiment of the invention.

FIG. 4 illustrates a top view of the film 300 according to an embodiment of the invention. In this embodiment, the film 300 includes one mask 460. In other embodiments, the film 300 includes more than one mask. The mask 460 (also known as a stencil or a photo resist stencil) is configured to be peeled away from the substrate 365, and then be placed onto an object such as the memorial or another substrate. In one embodiment, the mask 460 is defined as the bottom four layers of the film 300, without the silicon layer 365, and comprising one portion of the film 300 such that multiple masks can be included on one film. With the silicon layer 365 peeled away, the adhesive layer 370 of the mask 460 can be placed directly on an object such as the memorial.

The mask 460 has a design cutout portion representing the design which will be engraved into the object. The non-cutout portion is configured to block the engraving, such that the design is engraved therethrough. Although the illustrated mask 460 states one embodiment of words and artistic design, one with ordinary skill in the art could come up with other designs or have more than one mask per film 300. Typically, a film will include several masks.

FIG. 5 illustrates the process of engraving an object using the photo resist film 300 according to an embodiment of the invention. The process starts at step 500. At step 510, the film 300 is manufactured on a substrate 365. The manufacturing process to obtain a layered film is readily apparent to one of ordinary skill in the art.

At step 520, the mask 460 is peeled from the substrate 365 of the film 300 and applied to an object such as glass or the memorial. By having the pressure sensitive adhesive 370, the mask 460 can easily be removed, attached, and shifted prior to pressure being applied upon the object, while still being strong enough to not shift during engraving after pressure is applied.

The object, with the mask 460 firmly attached, is then engraved at step 530 to reveal the engraving. At step 540, the object is rinsed clean with a liquid such as water to reveal a clean engraved object that has been engraved. The process may be repeated recursively a number of times and ends at step 550.

FIG. 6 illustrates the process of designing and ordering an engraved product from the customer's perspective according to an embodiment of the invention. The process starts at step 600. At step 610, the customer or the salesperson enters information into the software regarding the engraved product. In the memorial embodiment, the information may include the deceased's name, date of birth, date of death, and a memorable quote. At step 620, the customer picks a design from one or more choices or advantageously imports the customer's own design. Unlike the prior art process where the customer must submit the information and wait for a design layout by a professional draftsman, the system 100 shows the customer exactly how the design will look prior to submitting the order.

At step 630, the customer submits the order. At step 640, the system 100 allows the customer the option to track their order using a link as it proceeds through production, a feature highly desired and currently unavailable in the art. The link allows the user to enter the software program 105 and find the status of their order (e.g., currently being engraved, the stone has been shipped, etc.) that is known because the barcode label 235 is being scanned throughout the process. The process may be repeated recursively a number of times and ends at step 650.

Figure 7:
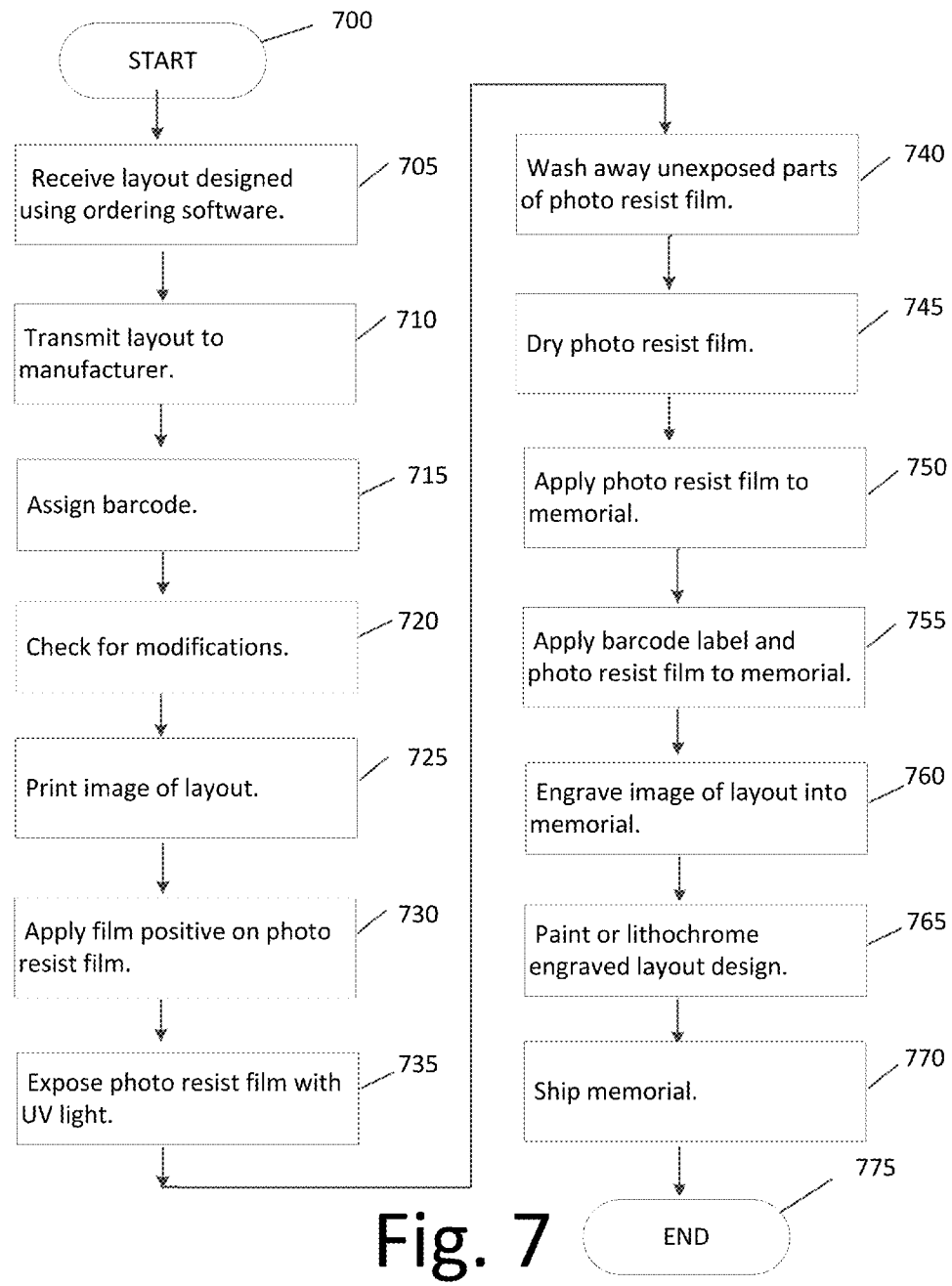
FIG. 7 illustrates the memorial creation process including designing, ordering, and engraving according to an embodiment of the invention.

FIG. 7 illustrates the memorial creation process including designing, ordering and engraving according to an embodiment of the invention. At step 705, the computer software program 105 receives a memorial layout designed by the customer utilizing the user-friendly computer software program 105 which is created for use by non-professionals. The computer software program and ordering process is also described above in FIGS. 1, 2, and 5 and also in U.S. patent application Ser. No. 14/216,133, filed Mar. 17, 2014, and entitled "Engraved product design software," the disclosure of which is hereby incorporated by reference in its entirety. The computer software program 105 can be a password protected secure system with a user login. The computer software program 105 can be cloud based such as being accessible via the Internet. In another embodiment, the computer software program 105 is located locally on a user's computer and/or the manufacturer's computer. The arrangement of artwork can be created in Adobe Illustrator.

At step 710, the memorial layout is transmitted electronically to the manufacturer by the computer software program 105 and/or the user, such as the salesman or the customer. In one embodiment, once the user transmits the layout by hitting submit, the control of the order switches to the manufacturer such that the manufacturer knows that the design is set, including the name, design, text, etc. If the user would like to make changes, they can do so via the communications portal, although it becomes more difficult to make changes after supplies are ordered (e.g., a headstone) or the engraving has begun.

At step 715, the barcode label 235 is assigned to the order for tracking purposes. The barcode label 235 is typically printed after the manufacturer reviews the order and confirms that it is ready for manufacturing, that is, the manufacturer did not discover any potential changes that would require the customer's re-approval. The barcode label 235 assists in tracking the order throughout the process. The barcode label 235 is a removable sticker with the actual barcode 240 or marker that can be read by a barcode reader, such that someone with a barcode reading gun can scan the barcode such that the user is aware of where the memorial is in the process. For example, when the mask 460 is completed, one of the first steps in the process, the manufacturer would scan the barcode 240. Additionally, the barcode label 235 has all the information relevant to the barcode for identification purposes as well as an image that shows what the finished product should look like, shown in thumbnail 260. The thumbnail 260 is a picture of the actual artwork for the photo resist. By putting the thumbnail 260 on a stone, the manufacturer is able to confirm that the stone receives the correct mask 460.

At step 720, the manufacturer checks for modifications, and if needed, minor modifications to the artwork are performed. Although a main advantage is that the software 105 reduces or eliminates the need for modifications because the user pre-approves the design on the fly, there are sometimes instances where minor modifications may be necessary. For example, the user's text may not be perfectly aligned, or the user's order may include a request or comments for a particular illustration, such as a specific cartoon character on the left-hand side of the memorial, and ask the manufacturing company to draw it for them. The extent of the modification would affect whether the manufacturer would send the design back to the user for another approval. For example, aligning text by moving it 3 millimeters might not require re-approval, whereas changing the spelling of a name would require re-approval.

At step 725, the manufacturer prints the image of the layout, that is, the film positive. The completed artwork is printed on a clear film or translucent vellum creating the film positive. This film positive is a black and white direct duplicate of artwork printed at a high resolution (e.g., 720-2880 dots per inch). In a film positive, the area of a film that is exposed to the ultraviolet light is washed away. The film positive is washed away such that the open area can be later engraved. In other words, in the film positive, what you see is what you get as your end result on the memorial. The term film positive, is a term in the photographic and film industries, which exposes the opposite of the better known term, a negative, also referred to as a film negative. In a film negative, what you see is the opposite of what your end result is, for example, on your printed paper, silk screen, or printing press.

At step 730, the film positive is then applied or sandwiched together below a UV light source and above the photo resist film utilizing a vacuum frame or equivalent. The film positive is also referred to herein as an image of the layout. The photo resist film process is also described above in FIGS. 3, 4, and 6 and also in U.S. patent application Ser. No. 13/975,581, filed Aug. 26, 2013 and entitled "Photo resist film with adhesive layer and microspheres," the disclosure of which is hereby incorporated by reference in its entirety.

At step 735, ultraviolet light is then used to burn the image into the photo resist film positive. The film positive, which is positioned between the source of UV light and the photo resist, burns the layout image into the photo resist such that the open areas in the photo resist will represent the layout design.

At step 740, water is used to wash away unexposed parts of design that were protected by the black areas of the film positive, such that you can see through to the photo resist film such that it can be engraved. The areas covered in black are water soluble, meaning it is capable of dissolving in water, whereas the clear areas of the film positive are not water soluble. The water is typically warm or hot, and the equipment is typically a water spray using single nozzles or an automated washout equipment or equivalent. One example of automated washout equipment is the 1650 Automatic Washout System by Rayzist Photomask, Inc., which provides continuous performance and streamlines the high demand photo resist film process.

At step 745, the material is dried either utilizing specialized drying equipment or simply air dried. Examples of specialized equipment include a photo print drier or a film drier.

At step 750, the photo resist is transferred to the surface of the memorial as described in the photo resist film process. The material is typically granite, but can be any other type of stone or other hard surface that can be engraved, including but not limited to marble, ceramic tile, glass, etc. The photo resist already has completed artwork, which can be highly detailed art or simply art.

Using a photo resist process in the memorial industry results in valuable time saving during production, as the conventional process' removal of cut material, referred to as "weeding" is not required. Weeding is the conventional process of removing material by hand that has already been cut using sheets or rolls of vinyl and a plotter with a blade that cuts the shapes or letters out. Weeding is burdensome and not precise, such that the layouts are typically limited to large bold letters. Embodiments of the present invention do not use weeding because it uses the photo resist process, that is, the removal of the design through the film positive, UV light, and water spray.

At step 755, the assigned barcode is applied to the granite memorial. Although applied at this step in the process, the assigned barcode can be attached to the memorial at any stage after the barcode label 235 is generated by the manufacturer.

At step 760, the manufacturer engraves the image of the layout into the memorial. The engraving is performed to erode the surface of the memorial (e.g., granite) where the photo resist applied thereon did not protect it from the engraving (e.g., sandblasting).

At step 765, the eroded surface of the memorial can be covered in paint, spray paint, or lithochrome while the memorial is still covered by the photo resist. As a result, paint fills the area that has just been engraved and makes the engraving stand out, easier to read, more vibrant and impressive. After the surface dries, the photo resist is peeled away, revealing a clean surface on the memorial. In one embodiment, the user selects the paint covering the text to be white lithochrome, the user select a black granite surface for the memorial such that the text engraving is filled with white paint, and the memorial has an engraved design of a rose which the user selects the flower to be painted red and the stem to be painted green. A popular memorial size selected by a user is a 24 inches by 12 inch by 3 inch thick grey granite memorial, although the user can select unique shapes or materials that require a custom order.

At step 770, the memorial is shipped to the desired facility which may be specified during the ordering process. Typically, the desired facility is a cemetery and the cemetery staff will set the memorial in the ground, and then the family is notified thereafter that the process is complete and the stone is set in the ground. Memorials are typically very heavy, such as a few hundred pounds, and therefore generally require professional assistance to setup. The notification can be completed via email or other means. The process ends at step 775.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multithreaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A method comprising:
   receiving a layout designed by a user of a computer software program, wherein the layout comprises an imported design template into the computer software program, wherein the imported design template is the user's own design to be engraved, customized by the user, and imported into the computer software program;
   transmitting the layout to a manufacturer using the computer software program;
   applying an image of the layout onto a photo resist film;
   exposing the photo resist film having the image of the layout applied thereon with ultraviolet light to burn the image of the layout into the photo resist film;
   applying the photo resist film to a memorial, wherein said applying the photo resist film to the memorial comprises applying pressure to the photo resist film and adhesion of the photo resist film to a surface of an object to be engraved, the photo resist film having a photo resist layer attached to a membrane layer, the photo resist layer having a design cutout portion and a non-cutout portion, wherein the non-cutout portion resists engraving from an engraving blast, wherein the photo resist layer comprises microspheres comprising pockets of air within the non-cutout portion of the photo resist layer, wherein the microspheres block the engraving from the engraving blast to ensure the non-cutout portion of the photo resist layer blocks areas which should not be engraved and the microspheres within the non-cutout portion of the photo resist layer repel the engraving from the engraving blast by creating a bounce back effect;
   applying a barcode label to the memorial, wherein the barcode label is configured to assist in tracking a status of an order, wherein the barcode label applied to the memorial comprises a thumbnail representation of the layout to allow the manufacturer to verify the correct layout is engraved into the memorial,
   wherein the computer software program comprises a link provided to the user, the link allowing the user to enter the computer software program and find the status of the order, the link tied to the barcode to track the status of the order, wherein the status of the order is transmitted to the computer software program having the link provided to the user, the status of the order determined using the barcode; and
   engraving through the photo resist film into the memorial to engrave the image of the layout into the memorial, wherein the photo resist film, through an adhesive layer, is repositionable on the memorial prior to said applying the photo resist film to the memorial, the adhesive layer of the photo resist film comprising a water-based acrylic emulsion adhesive, wherein the water-based acrylic emulsion adhesive of the adhesive layer is configured to be attached to a substrate or an object, wherein the water-based acrylic emulsion adhesive allows the adhesive layer to be repositioned on the substrate or the object after a release liner or a silicon layer is peeled away from the adhesive layer.

2. The method of claim 1, wherein the image of the layout comprises a film positive.

3. The method of claim 1, wherein the user comprises a customer or a salesperson.

4. The method of claim 1, wherein the user is not a professional draftsman.

5. The method of claim 1, wherein the engraving comprises sandblasting.

6. The method of claim 1 further comprising painting the surface of the memorial after the engraving.

7. The method of claim 1 further comprising shipping the memorial after the engraving to a cemetery, a home of the user, or a business of the user.

8. The method of claim 1 further comprising notifying the user that the process is complete.

9. A method comprising:
   receiving a layout designed by a user of a computer software program, wherein the layout comprises an imported design, wherein the imported design is the user's own design, customized by the user, and imported into the computer software program;
   transmitting the layout to a manufacturer using the computer software program;
   applying an image of the layout onto a photo resist film;
   exposing the photo resist film having the image of the layout applied thereon with ultraviolet light to burn the image of the layout into the photo resist film;
   applying the photo resist film to a memorial, the photo resist film having a photo resist layer attached to a membrane layer, the photo resist layer having a design cutout portion and a non-cutout portion, wherein the non-cutout portion resists the engraving from an engraving blast, wherein the photo resist layer comprises microspheres comprising pockets of air within the non-cutout portion of the photo resist layer, wherein the microspheres block the engraving from the engraving blast to ensure the non-cutout portion of the photo resist layer blocks areas which should not be engraved and the microspheres within the non-cutout portion of the photo resist layer repel the engraving from the engraving blast by creating a bounce back effect;
   applying a barcode label to the memorial, wherein the barcode label is configured to assist in tracking a status of an order, wherein the barcode label applied to the memorial comprises a thumbnail representation of the layout to allow the manufacturer to verify the correct layout is engraved into the memorial; and
   engraving through the photo resist film into the memorial to engrave the image of the layout into the memorial.

10. A method comprising:
   receiving a layout designed by a user of a computer software program, wherein the layout comprises an imported design, wherein the imported design is the user's own design, customized by the user, and imported into the computer software program;
   transmitting the layout to a manufacturer using the computer software program;
   applying an image of the layout onto a photo resist film;
   exposing the photo resist film having the image of the layout applied thereon with ultraviolet light to burn the image of the layout into the photo resist film;
   applying the photo resist film to a memorial;
   applying a barcode label to the memorial, wherein the barcode label is configured to assist in tracking a status of an order, wherein the barcode label applied to the memorial comprises a thumbnail representation of the layout to allow the manufacturer to verify the correct layout is engraved into the memorial; and engraving through the photo resist film into the memorial to engrave the image of the layout into the memorial, the photo resist film comprising an adhesive layer comprising a water-based acrylic emulsion adhesive, wherein the water-based acrylic emulsion adhesive of the adhesive layer is configured to be attached to a substrate or an object, wherein the water-based acrylic emulsion adhesive allows the adhesive layer to be repositioned on the substrate or the object after a release liner or a silicon layer is peeled away from the adhesive layer.

\* \* \* \* \*